United States Patent
Golisch et al.

(10) Patent No.: US 6,512,977 B2
(45) Date of Patent: Jan. 28, 2003

(54) METHOD AND DEVICE FOR READING NAVIGATION DATA

(75) Inventors: Frank Golisch, Braunschweig (DE); Dieter Kriegel, Adenbüttel (DE); Thomas Dobberkau, Meine (DE); Stefan Sievers, Wasbüttel (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/873,507

(22) Filed: Jun. 4, 2001

(65) Prior Publication Data

US 2002/0001260 A1 Jan. 3, 2002

Related U.S. Application Data

(63) Continuation of application No. PCT/EP99/08549, filed on Nov. 8, 1999.

(51) Int. Cl.⁷ .................................................. G01C 21/34
(52) U.S. Cl. ...................... 701/207; 701/211; 340/990; 340/995
(58) Field of Search ................................. 701/201, 207, 701/208, 209, 211; 340/988, 990, 995; 369/21; 386/105

(56) References Cited

U.S. PATENT DOCUMENTS

| Patent | | Date | Inventor | Page |
|---|---|---|---|---|
| 4,796,100 A | * | 1/1989 | Sakaguchi | 386/105 |
| 4,926,336 A | | 5/1990 | Yamada | 701/202 |
| 5,101,257 A | | 3/1992 | Tempelhof | 364/449 |
| 5,592,389 A | * | 1/1997 | La Rue et al. | 340/995 |
| 5,627,547 A | | 5/1997 | Ramsawamy et al. | 342/357 |
| 5,724,316 A | * | 3/1998 | Brunts | 340/988 |
| 5,774,828 A | * | 6/1998 | Brunts et al. | 701/208 |
| 5,887,269 A | * | 3/1999 | Brunts et al. | 701/208 |
| 5,964,821 A | * | 10/1999 | Brunts et al. | 701/201 |

FOREIGN PATENT DOCUMENTS

| | | |
|---|---|---|
| EP | 0511447 | 11/1992 |
| WO | 9627842 | 9/1996 |

OTHER PUBLICATIONS

English language Abstract for JP 9062183.
English language Abstract for JP 9113286.
English language Abstract for JP 8063946.
English language Abstract for JP 9021649.
English language Abstract for JP 09049739.
English language Abstract for JP 06201390.

\* cited by examiner

*Primary Examiner*—Gary Chin
(74) *Attorney, Agent, or Firm*—Baker Botts LLP

(57) ABSTRACT

Simplified navigation directions are provided when a navigation compact disk is not available in a shared compact disk reader. In a preferred arrangement, simplified navigation directions include heading to desired destination and/or distance to desired destination. An audio compact disk may be played while the simplified directions are provided. When a navigation compact disk is available in a shared compact disk reader, detailed directions may be calculated and provided.

5 Claims, 1 Drawing Sheet

METHOD AND DEVICE FOR READING NAVIGATION DATA

RELATED APPLICATIONS

This application is a continuation of PCT/EP99/08549 filed Nov. 8, 1999, which International application was published by the International Bureau in German on Jun. 15, 2000.

BACKGROUND OF INVENTION

The invention relates to a method and system for processing navigation data and playing recorded audio compact disks using a shared compact disk device.

Navigation systems that provide a vehicle operator with directions to a desired destination are well known in the art. These systems typically employ a global positioning system (GPS) sensor to establish the current latitude and longitude of the vehicle or the exact location of a destination. Such systems also employ a compact disk ("CD") mechanism or player to permit reading of compact disks on which road map information is stored. Using the information stored on the compact disk as well as the information reported by the GPS sensor, the navigation system can determine a route and provide directions to a desired destination.

Because many vehicle operators desire to listen to audio recordings on compact disk while operating their vehicle, the present invention provides the ability to use one compact disk player to read navigation information from a compact disk as well as for playing audio recordings from a compact disk.

DE 3,904,344 A1 discloses a method of reading navigation data from a compact disk, which is stored with a plurality of audio compact disks in a CD changer. The navigation data are read only during playback pauses of the audio disk, so that when playing audio disks, interfering interruptions are avoided.

Japanese Patent Publication Number JP-A-09-062 183 (D1) disclose a navigation mechanism and CD player, in which system data read from navigation data CD's are stored in an intermediate memory so that the data CD can be removed from the CD player and replaced by an audio CD. Japanese Patent Publication Number JP-A-09 049 739 also discloses method and apparatus for reading all available navigation data respecting a trip destination from a CD and storing the information in an intermediate memory, thereby freeing the CD player for playback of audio compact disks. In each case, a disadvantage is that a very large intermediate memory is required.

These prior systems require complex components to enable the same CD player to read and play back both data and also audio CD disks.

An object of the present invention is to provide a method, and system for practicing the method, for reading navigation data from CD disks and for reading and playing back audio from CD disks, that can be practiced without resort to the complexity of the prior art technology.

SUMMARY OF THE INVENTION

In one preferred embodiment of the present invention, a method and system for performing the method are provided for displaying simplified directions to a desired destination and operating a shared compact disk reader, such as a CD-ROM drive. In a preferred embodiment, the method includes receiving destination information from a vehicle operator as well as current position information from a navigation sensor such as a GPS receiver. If map information on a compact disk is not available, such as when an audio compact disk is being played in the compact disk reader, a determination of simplified directions to the desired destination is made and the simplified directions are reported to the vehicle operator.

In another preferred embodiment, the simplified directions include directional information, geometric distance to the desired destination, and/or estimated road travel distance to the desired destination.

In yet another preferred embodiment, the simplified directions are visually displayed or acoustically reported to the vehicle operator.

In another preferred embodiment of the present invention, a single compact disk reader is connected via a controllable hardwired switch or via a controllable software switch alternatively to an audio system and to a navigation data processor. When the switch is set to pass information from the compact disk device to the navigation data processor, the processor is able to determine and report detailed directions to a desired destination. When the switch is set to pass information, such as audio recordings, from the compact disk device to the audio system, the navigation data processor determines and reports simplified directions to a desired destination. In this embodiment, the additional apparatus outlay required to use a single compact disk reader to read navigation data from one CD disk and also to playback audio recordings comprises no additional electronic means except the controllable switch.

The invention is described in detail below by reference to the accompanying drawing of a system which illustrates a preferred embodiment of the present invention and serves to explain the principles of the present invention. The drawing is incorporated and constitutes part of this disclosure. The scope of the invention is pointed out in the appended claims.

DESCRIPTION OF THE PREFERRED EMBODIMENTS

Figure 1:
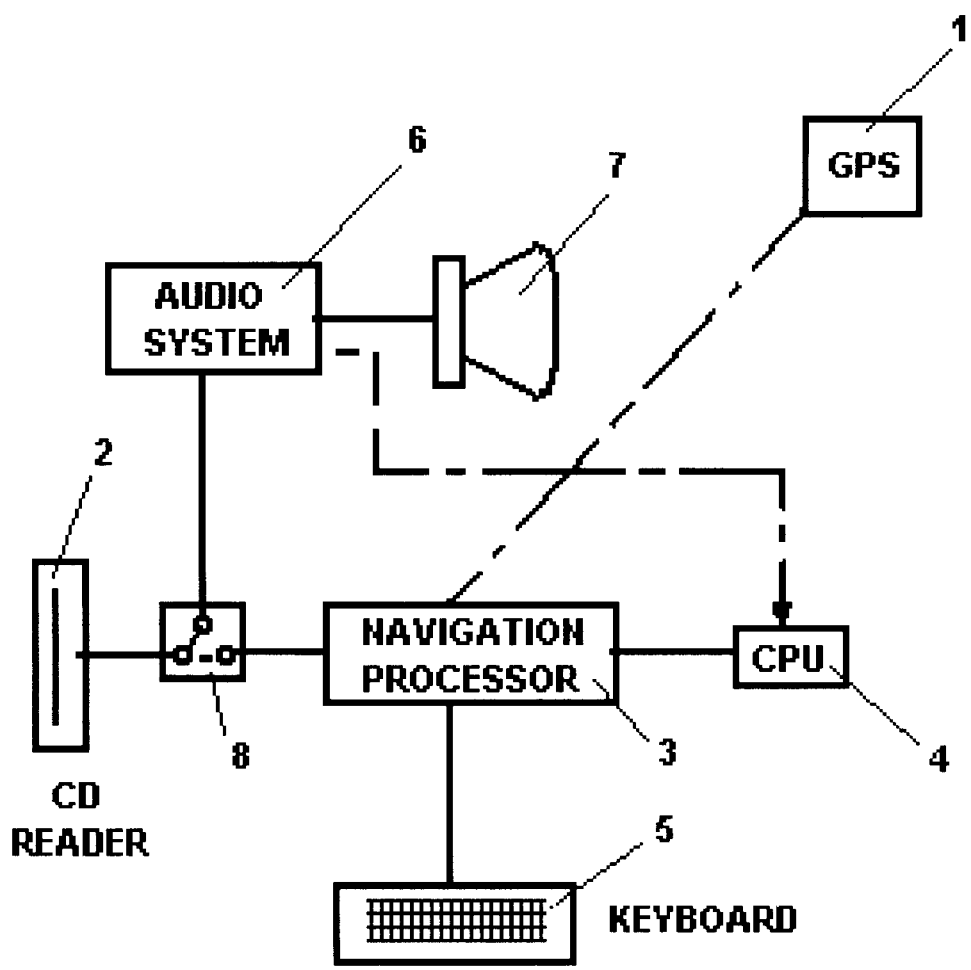
FIG. 1 is a functional diagram of a system in accordance with the present invention.

In the navigation and compact disk playback system of FIG. 1, a navigation means constructed in accordance with the present invention is shown in radio communication with a global positioning system 1. The navigation means comprises a compact disk mechanism or reader 2, a data processing unit 4 and an output unit 4, into which directions to a destination are inputted on keyboard 5. The output of CD mechanism 2 is connected alternatively to audio system 6 and navigation processor 3 by operation of switch unit 8. The switch unit 8 can be either a hardwired hardware switch or a software switch.

In a preferred embodiment, switch unit 8 is embodied as a software switch and automatically switches its output to the input of audio system 6 when the compact disk placed in compact disk device 2 contains prerecorded audio data and automatically switches its output to the input of navigation processor 3 when the compact disk placed in the device 2 contains navigation data such as map information. Alternatively, in another embodiment, the vehicle operator may manually operate switch 8 to perform the switching operation described.

Navigation processor 3 is capable of accepting a desired destination from input device 5 and accepting current position information from navigation sensor 1.

In a preferred embodiment, input device 5 may be a keypad, keyboard, touch screen display, or may be a voice recognition device capable of understanding verbal commands from a vehicle operator. Other input devices will be apparent to one skilled in the art.

Navigation sensor 1 is preferably a global positioning system (GPS) device capable of reporting the current latitude and longitude of the vehicle, although other sensors, such as dead-reckoning systems could be used. In one preferred embodiment, navigation sensor 1 is in radio communication with navigation processor 3. Alternatively, navigation sensor 1 may be in communication with navigation processor 3 via wire, data bus, or other well known connection methods.

When receiving information from compact disk reader 2, navigation processor 3, using current position information received from navigation sensor 1, can provide detailed turn-by-turn guidance to the desired destination via output device 4 using methods well known to one skilled in the art. When not receiving information from compact disk device 2, navigation processor 3 can fix the location coordinates of the desired destination so that, using current position information received from navigation sensor 1, simplified directions to the desired destination can be continuously indicated via output device 4. Consequently, when the vehicle operator is in need of detailed directions to the desired destination, he or she may insert a navigation compact disk into compact disk device 2. This will be advantageous when the vehicle operator is in a large town and is unfamiliar with the travel route to the desired destination. In contrast, when simplified directions to the desired destination would suffice, such as during freeway travel, long distance trips or when the vehicle operator is familiar with the travel route, the navigation compact disk may be removed from the compact disk reader 2.

Navigation data output device 4 may be a visual display device, such as an LCD, CRT organic electroluminescent display (OELD) or other well known display technology. Alternatively, or in addition, output device 4 may be connected to audio system 6 and directions can also be acoustically provided to the vehicle operator.

In a preferred embodiment, when navigation processor 3 is not receiving data from compact disk reader 2, the simplified directions to the desired destination are represented on output device 4 as a directional arrow indicating heading to the desired destination and/or geometric or estimated road travel distance to the desired destination. Calculating heading information is the result of application of a simple trigonometric function that calculates the heading angle to the desired destination from the vehicle's current position and orientation. This calculation is well known to one skilled in the art. Geometric distance is a simple "crow's flight" distance from the vehicle's current coordinates to the desired destination. This distance may be calculated using the Pythagorean theorem or similar mathematical techniques well known to one skilled in the art. Estimated road travel distance is an estimation of actual road miles from the vehicle's current location to the desired destination. This distance will always be larger than the geometric distance and is calculated by multiplying the geometric distance by an enlarging factor to account for indirect road travel routes compared to "crow's flight" travel routes.

When a compact disk containing audio data is placed in compact disk reader 2, switch 8 is positioned so that information from compact disk reader 2 is passed to audio system 6 where the recorded audio data is amplified and passed to audio speaker 7 for acoustical output to the vehicle passenger compartment.

The foregoing merely illustrates exemplary embodiments of the invention. Various modifications and alterations to the described embodiments will be apparent to those skilled in the art in view of the teachings herein. It will thus be fully appreciated that those skilled in the art will be able to devise numerous systems and methods which, although not explicitly shown or described, embody the principles of the invention and are thus within the spirit and scope of the invention. As noted, the scope of the invention is defined only by the appended claims.

We claim:

1. In a system wherein a navigation device is coupled to receive navigation data from a compact disk reader and an audio device is coupled to receive recorded audio information from said compact disk reader, which can be operated in order to provide the driver with detailed directions to a desired destination, a method for providing navigation instructions to a driver while playing recorded audio from a compact disk, comprising:

reading navigation data from a navigation data disk in said compact disk reader and selecting destination coordinates using said navigation data;

storing said destination coordinates and removing said navigation data disk from said compact disk reader;

operating said compact disk reader to play recorded audio read from a compact disk containing prerecorded audio information;

deriving current position information, which denotes current position, using a navigation sensor; and providing a display of simplified directions comprising at least direction information derived from said current position information and said destination coordinates, and wherein the display of said direction information includes displaying an arrow corresponding to said direction information during said play of recorded audio.

2. A method according to claim 1 wherein the distance between said current position and said destination coordinates is computed and displayed.

3. A method according to claim 2 wherein said distance is calculated using a direct path distance.

4. A navigation system for a motor vehicle, comprising:

a position sensor for providing navigation data representing the current location of said motor vehicle;

a compact disk reader reading map data disks and audio disks;

an output device for displaying directions;

an audio system arranged to receive audio disk signals from said compact disk reader;

a data processor and a controllable switch, wherein said switch can be set in order to pass information from said compact disk reader to said data processor and to pass information from compact disk reader to the audio system, wherein said data processor is arranged to receive map data from said compact disk reader, and said navigation data from said position sensor and provide detailed directions to a selected destination on said output device while said compact disk reader supplies said map data, wherein said processor is further arranged to compute and store coordinates of said selected destination and to provide said output device with simplified directions specifying the direction of said selected destination while said compact disk reader supplies said audio signals to said audio system.

5. A navigation system as specified in claim 4 wherein said output device is a device selected from an acoustic device and a display device, and wherein said data processor is arranged to provide said simplified directions to said output device when a map data disk is not present in said compact disk reader.

* * * * *